US010837759B2

(12) United States Patent
Wakabayashi et al.

(10) Patent No.: US 10,837,759 B2
(45) Date of Patent: Nov. 17, 2020

(54) THREE-DIMENSIONAL MEASURING DEVICE, CONTROLLER, AND ROBOT SYSTEM

(71) Applicant: Seiko Epson Corporation, Tokyo (JP)

(72) Inventors: Shuichi Wakabayashi, Okaya (JP); Makiko Hino, Matsumoto (JP); Hirosada Horiguchi, Minowa (JP); Daisuke Ishida, Chino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 16/451,546

(22) Filed: Jun. 25, 2019

(65) Prior Publication Data

US 2019/0390952 A1     Dec. 26, 2019

(30) Foreign Application Priority Data

Jun. 26, 2018  (JP) .................................. 2018-120989

(51) Int. Cl.
| | |
|---|---|
| *G01B 11/28* | (2006.01) |
| *G01C 15/00* | (2006.01) |
| *G01B 11/02* | (2006.01) |

(52) U.S. Cl.
CPC ............ *G01B 11/028* (2013.01); *G01B 11/28* (2013.01); *G01C 15/002* (2013.01)

(58) Field of Classification Search
CPC ........ G01B 11/028; G01S 17/46; G01S 17/04
USPC ....................................................... 356/614
See application file for complete search history.

(56) References Cited

U.S. PATENT DOCUMENTS

| | | | | |
|---|---|---|---|---|
| 2010/0207036 | A1* | 8/2010 | Massonneau | A61B 5/0059 250/459.1 |
| 2011/0001957 | A1* | 1/2011 | Braune | G06K 9/2027 356/4.01 |
| 2012/0242974 | A1* | 9/2012 | LaValley | G01S 17/04 356/5.01 |
| 2019/0129035 | A1* | 5/2019 | Valouch | G01S 7/4815 |

FOREIGN PATENT DOCUMENTS

| | | |
|---|---|---|
| JP | 2002-214364 A | 7/2002 |
| JP | 2004-333369 A | 11/2004 |
| JP | 2009-162709 A | 7/2009 |

* cited by examiner

*Primary Examiner* — Hung Nguyen
(74) *Attorney, Agent, or Firm* — Harness, Dickey & Pierce, P.L.C.

(57) ABSTRACT

A three-dimensional measuring device includes a human detection information receiver for receiving information from a human detection sensor that detects a person present within a detection range, a laser emitter for irradiating a region including the object with the laser beam, a laser emission controller for controlling power of the laser beam irradiated from the laser emitter to first power and second power lower than the first power, an image capturing device for imaging the object, on which the laser beam is irradiated, and acquiring image data, and a point-group-data generator for generating, based on the image data, three-dimensional point group data of a region including the object. When the human detection information receiver receives, from the human detection sensor, first information indicating that a person is absent from the detection range, the laser emission controller controls the power of the laser beam to the first power.

9 Claims, 9 Drawing Sheets

THREE-DIMENSIONAL MEASURING DEVICE, CONTROLLER, AND ROBOT SYSTEM

The present application is based on, and claims priority from, JP Application Serial Number 2018-120989, filed Jun. 26, 2018, the disclosure of which is hereby incorporated by reference herein in its entirety.

BACKGROUND

1. Technical Field

The present disclosure relates to a three-dimensional measuring device, a controller, and a robot system.

2. Related Art

JP-A-2004-333369 (Patent Literature 1) describes an articulated robot mounted with a three-dimensional shape measuring device. The three-dimensional shape measuring device mounted on the articulated robot includes a laser beam irradiator for measurement configured to scan a laser beam for measurement toward an object to thereby project a pattern on the object and an optical receiver configured to acquire an image of the object on which the pattern is projected. The three-dimensional shape measuring device is configured to perform three-dimensional measurement of the object based on the image acquired by the optical receiver.

When performing the three-dimensional measurement of the object using the three-dimensional shape measuring device that makes use of the laser beam for measurement, for example, it is necessary to take measures to reduce power (intensity) of the laser beam for measurement in case of presence of a person around the robot. However, when the power of the laser beam for measurement is reduced, contrast of the pattern projected on the object decreases and accuracy of the three-dimensional measurement of the object is deteriorated.

SUMMARY

A three-dimensional measuring device according to an aspect of the present disclosure is a three-dimensional measuring device that performs three-dimensional measurement of an object using a laser beam. The three-dimensional measuring device includes: a human detection information receiver configured to receive information from a human detection sensor that detects a person present within a detection range; a laser emitter configured to irradiate a region including the object with the laser beam; a laser emission controller configured to control power of the laser beam irradiated from the laser emitter to first power and second power lower than the first power; an image capturing device configured to image the object, on which the laser beam is irradiated, and acquire image data; and a point-group-data generator configured to generate, based on the image data, three-dimensional point group data of a region including the object. When the human detection information receiver receives, from the human detection sensor, first information indicating that a person is absent within the detection range, the laser emission controller controls the power of the laser beam to the first power.

DESCRIPTION OF EXEMPLARY EMBODIMENTS

A three-dimensional measuring device, a controller, and a robot system according to the present disclosure are explained in detail below based on embodiments shown in the accompanying drawings.

First Embodiment

Figure 1:
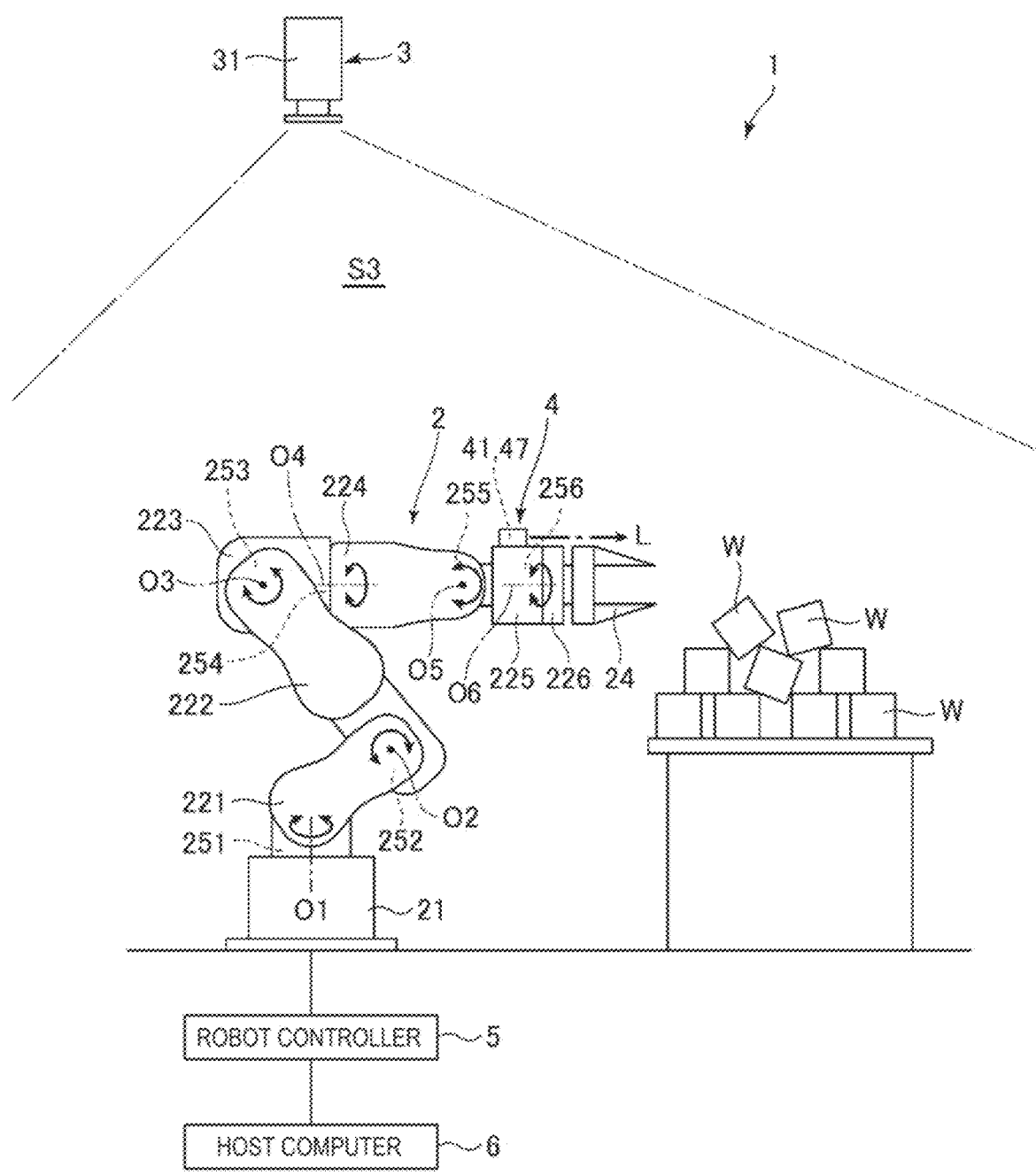
FIG. 1 is a diagram showing an overall configuration of a robot system according to a first embodiment of the present disclosure.
Figure 2:
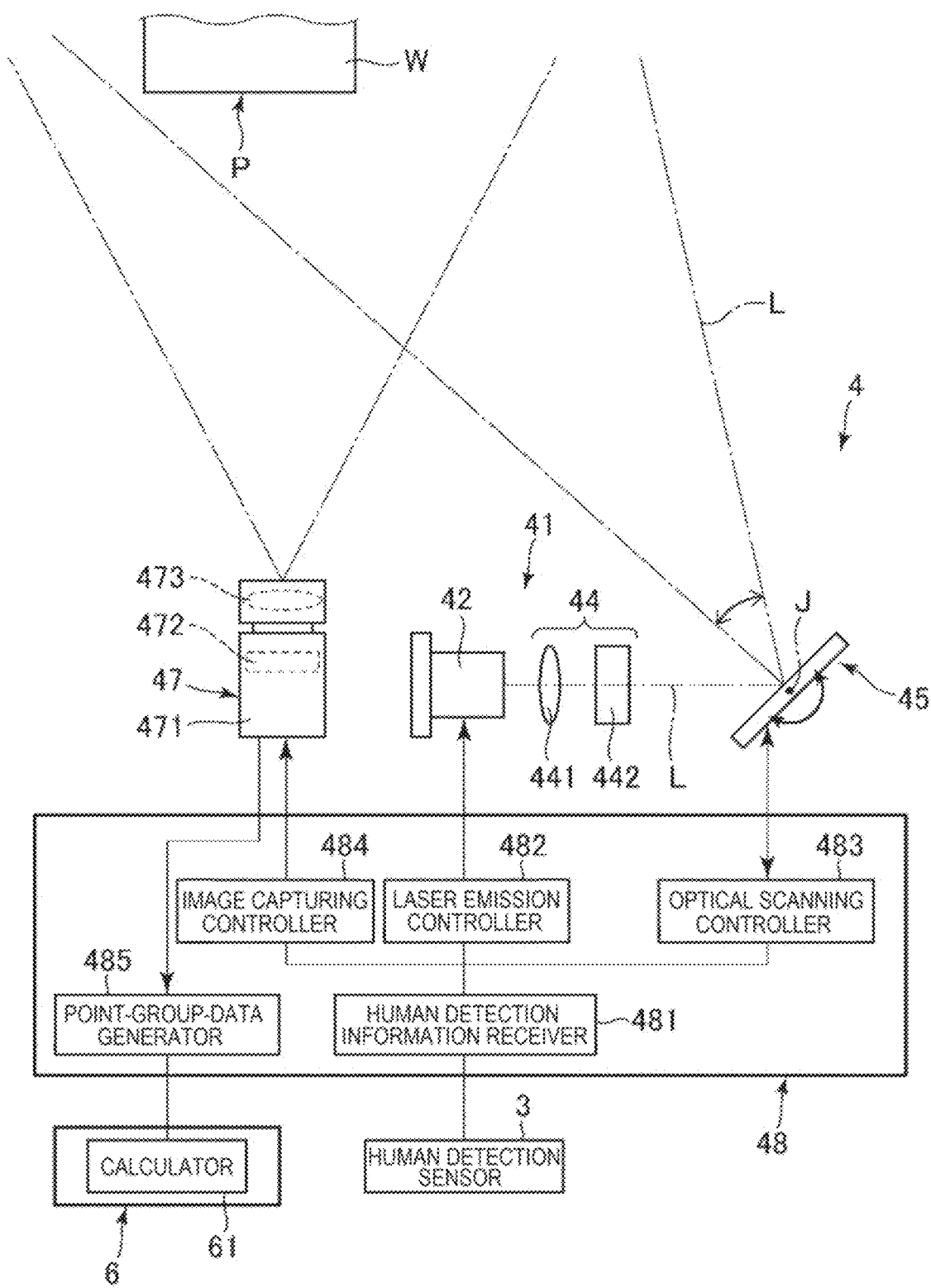
FIG. 2 is a diagram showing an overall configuration of a three-dimensional measuring device.
Figure 3:
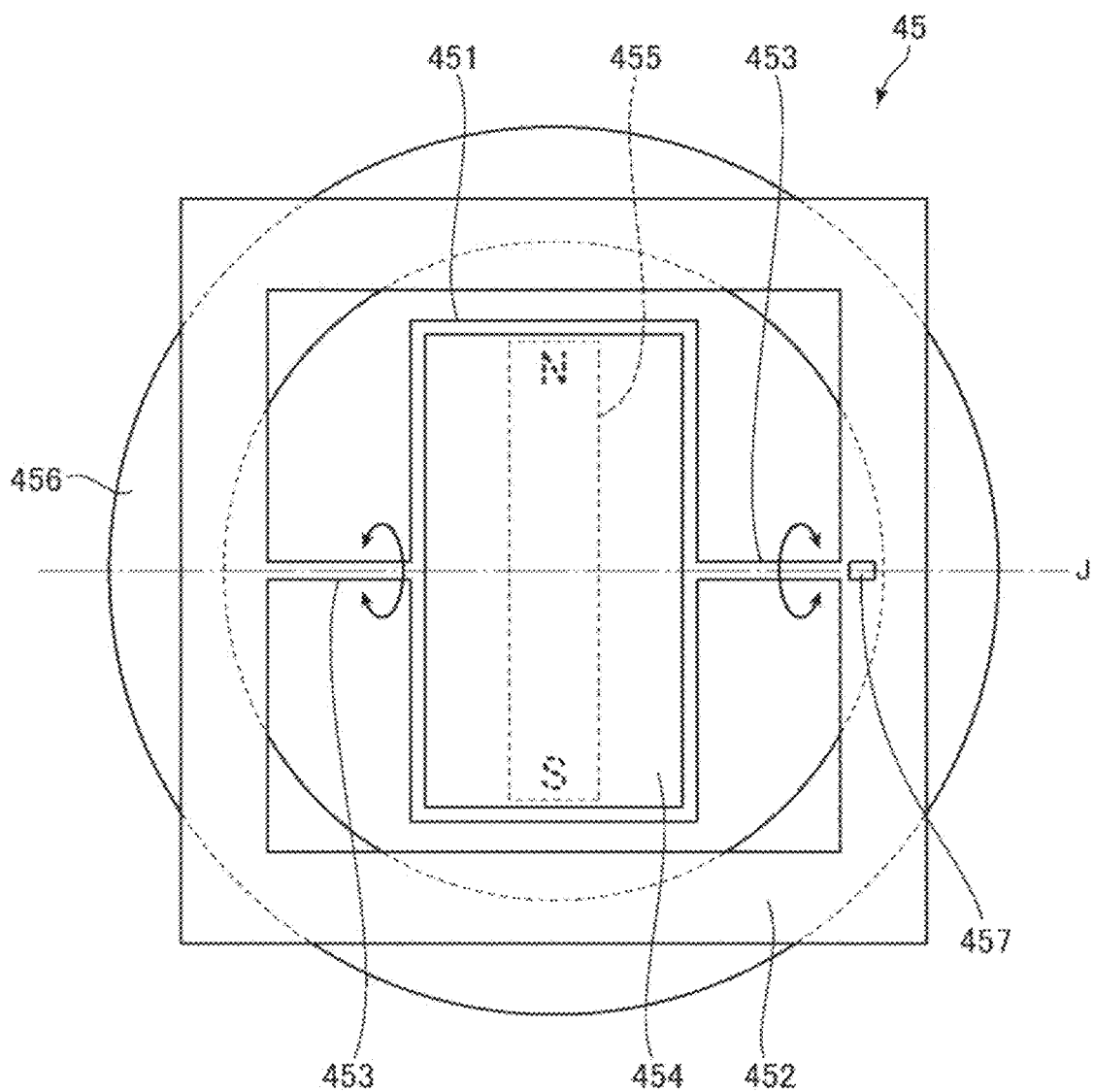
FIG. 3 is a plan view showing an optical scanner included in the three-dimensional measuring device shown in FIG. 2.
Figure 4:
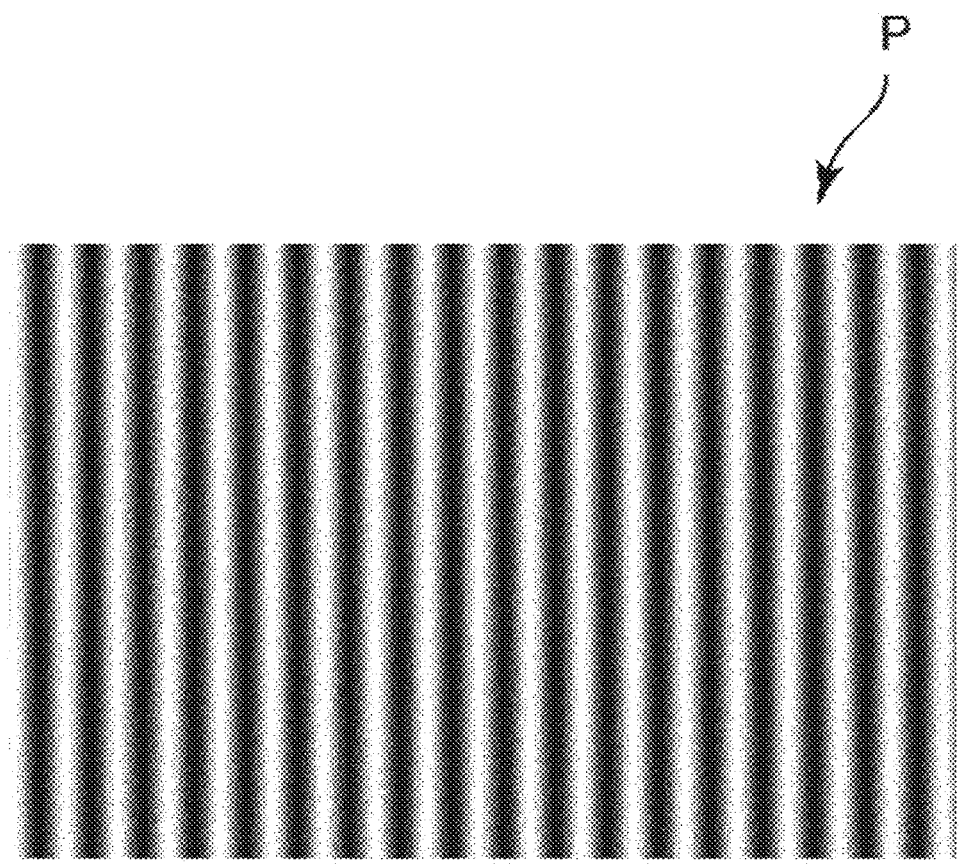
FIG. 4 is a plan view showing a projection pattern projected by a laser emitter.
Figure 5:
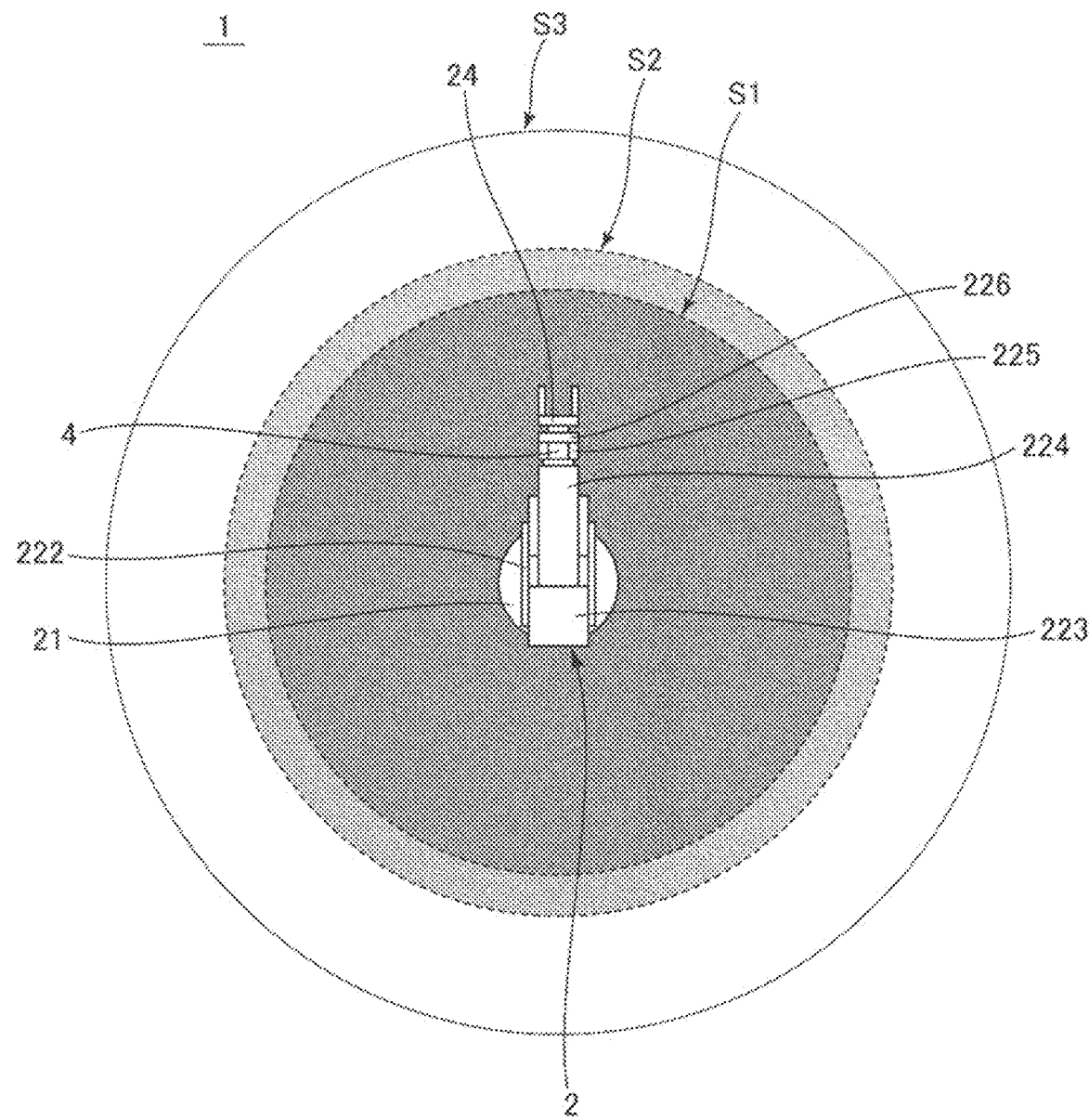
FIG. 5 is a plan view showing a detection range set in a robot system.

FIG. 1 is a diagram showing an overall configuration of a robot system according to a first embodiment of the present disclosure. FIG. 2 is a diagram showing an overall configuration of a three-dimensional measuring device. FIG. 3 is a plan view showing an optical scanner included in the three-dimensional measuring device shown in FIG. 2. FIG. 4 is a plan view showing a projection pattern projected by a laser emitter. FIG. 5 is a plan view showing a detection range set in a robot system.

A robot system 1 shown in FIG. 1 is a robot system of a human coexistent type based on the premise that the robot system 1 coexists with a person, that is, the person works around the robot system 1. Therefore, the robot system 1 is configured to detect presence of a person present within a detection range and take measures corresponding to the presence of the person.

The robot system 1 includes a robot 2, a human detection sensor 3 configured to detect a person present within a detection range set around the robot 2, a three-dimensional measuring device 4 configured to three-dimensionally measure an object W using a laser beam L, a robot controller 5 configured to control driving of the robot 2 based on a measurement result of the three-dimensional measuring device 4, and a host computer 6 capable of communicating with the robot controller 5. The sections are enabled to communicate by wire or radio. The communication may be performed via a network such as the Internet.

When the human detection sensor 3 detects a person within the detection range, such a robot system 1 reduces power of the laser beam L to a level that is safe even if the laser beam L enters the eyes of the person present within the detection range. Consequently, the robot system 1 is safe for the person present within the detection range. Such a robot system 1 is explained in detail below.

Robot

The robot 2 is a robot that performs work such as supply, removal, conveyance, and assembly of a precision instrument and components configuring the precision instrument. However, uses of the robot 2 are not particularly limited.

The robot 2 is a six-axis robot. The robot 2 includes, as shown in FIG. 1, a base 21 fixed to a floor or a ceiling, a first arm 221 coupled to the base 21 turnably around a first axis O1, a second arm 222 coupled to the first arm 221 turnably around a second axis O2, a third arm 223 coupled to the second arm 222 turnably around a third axis O3, a fourth arm 224 coupled to the third arm 223 turnably around a fourth axis O4, a fifth arm 225 coupled to the fourth arm 224 turnably around a fifth axis O5, and a sixth arm 226 coupled to the fifth arm 225 turnably around a sixth axis O6. A hand coupling section is provided in the sixth arm 226. An end effector 24 corresponding to work to be executed by the robot 2 is attached to the hand coupling section.

The robot 2 includes a first driving device 251 configured to turn the first arm 221 with respect to the base 21, a second driving device 252 configured to turn the second arm 222 with respect to the first arm 221, a third driving device 253 configured to turn the third arm 223 with respect to the second arm 222, a fourth driving device 254 configured to turn the fourth arm 224 with respect to the third arm 223, a fifth driving device 255 configured to turn the fifth arm 225 with respect to the fourth arm 224, and a sixth driving device 256 configured to turn the sixth arm 226 with respect to the fifth arm 225. The first to sixth driving devices 251 to 256 respectively include, for example, motors functioning as driving sources, controllers configured to control driving of the motors, and encoders configured to detect rotation amounts of the motors. The first to sixth driving devices 251 to 256 are respectively independently controlled by the robot controller 5.

The robot 2 is not limited to the configuration in this embodiment. For example, the number of arms may be one to five or may be seven or more. For example, a type of the robot 2 may be a SCARA robot or a double-arm robot.

Robot Controller

The robot controller 5 receives a position command for the robot 2 from the host computer 6 and respectively independently controls driving of the first to sixth driving devices 251 to 256 to locate the arms 221 to 226 in positions corresponding to the received position command. The robot controller 5 is configured from, for example, a computer. The robot controller 5 includes a processor (a CPU) configured to process information, a memory communicably connected to the processor, and an external interface. Various computer programs executable by the processor are saved in the memory. The processor can read and execute the various computer programs and the like stored in the memory.

Human Detection Sensor

The human detection sensor 3 detects presence or absence of a person within a laser beam power control area S3 (a detection range) set around the robot 2. The human detection sensor 3 transmits a result of the detection to the three-dimensional measuring device 4. In the following explanation, first information output from the human detection sensor 3 when a person is absent within the laser beam power control area S3 is referred to as "non-detection signal" as well. Second information output from the human detection sensor 3 when the person is present within the laser beam power control area S3 is referred to as "detection signal" as well.

The configuration of the human detection sensor 3 is not particularly limited as long as such an object can be achieved. As shown in FIG. 1, the human detection sensor 3 in this embodiment is provided above the robot 2. The human detection sensor 3 includes a camera 31 capable of imaging the entire region of the laser beam power control area S3. The human detection sensor 3 is configured to detect a person present within the laser beam power control area S3 based on image data captured by the camera 31. However, the disposition of the camera 31 is not limited to a ceiling. The camera 31 may be provided on a wall, may be provided on a movable or stationary stand, or may be provided on a floor. The number of cameras 31 is not limited and may be two or more. The camera 31 may be provided in, for example, the robot 2. In this case, a camera 471 explained below may function as the camera 31 as well. Besides, a weight sensor, a laser beam sensor, an infrared sensor, a sensor of a capacitance type, and the like may be used as the human detection sensor 3.

Three-Dimensional Measuring Device

The three-dimensional measuring device 4 detects a posture, a position, and the like of the object W according to a phase shift method. As shown in FIG. 2, the three-dimensional measuring device 4 includes a laser emitter 41 configured to irradiate a region including the object W with the laser beam L, an image capturing device 47 configured to image the object W, on which the laser beam L is irradiated, and acquire image data, and a controller 48 configured to control driving of the laser emitter 41 and the image capturing device 47 and generate three-dimensional point group data of the object W from the image data acquired by the image capturing device 47.

Among these components, the laser emitter 41 and the image capturing device 47 are respectively fixed to the fifth arm 225 of the robot 2. The laser emitter 41 is disposed to irradiate the laser beam L toward the distal end side (the end effector 24 side) of the fifth arm 225. The image capturing device 47 is disposed to face the distal end side (the end effector 24 side) of the fifth arm 225 and image a region including an irradiation range of the laser beam L.

A relation in which the end effector 24 is located on the distal end side of the fifth arm 225 is maintained even if the arms 221 to 224 and 226 other than the fifth arm 225 move. Therefore, when the laser emitter 41 and the image capturing device 47 are fixed to the fifth arm 225, the three-dimensional measuring device 4 can always emit the laser beam L to the distal end side of the end effector 24 and can image the distal end side of the end effector 24. Therefore, irrespective of a posture at the time when the robot 2 is about to grip the object W with the end effector 24, that is, a posture in which the end effector 24 is opposed to the object W, in the posture, the three-dimensional measuring device 4 can irradiate the laser beam L toward the object W and can image the object W. Therefore, the three-dimensional measuring device 4 can more surely perform three-dimensional measurement of the object W.

However, the disposition of the laser emitter 41 and the image capturing device 47 is not particularly limited. The laser emitter 41 and the image capturing device 47 may be fixed to the first to fourth arms 221 to 224 and the sixth arm 226. The laser emitter 41 and the image capturing device 47 may be fixed to arms different from each other. At least one of the laser emitter 41 and the image capturing device 47 may be fixed to an unmovable part such as the base 21, the floor, the ceiling, or the wall.

The laser emitter 41 has a function of irradiating the laser beam L toward the object W to thereby project a predetermined projection pattern P (see FIG. 4) on the object W. Such a laser emitter 41 includes a laser beam source 42 configured to emit the laser beam L, an optical system 44 including a plurality of lenses through which the laser beam L passes, and an optical scanner 45 configured to scan the laser beam L, which has passed through the optical system 44, toward the object W.

The laser beam source 42 is not particularly limited. For example, semiconductor lasers such as a vertical cavity surface emitting laser (VCSEL) and a vertical external cavity surface emitting laser (VECSEL) can be used. A wavelength of the laser beam L is not particularly limited. The wavelength of the laser beam L may be in a visible region (400 to 700 nm), may be in an invisible region (400 nm or less and 1400 nm to 1 mm), or may be in a near-infrared region (700 to 1400 nm). However, the wavelength of the laser beam L is desirably in the visible region (400 to 700 nm). In the visible region, even if the laser beam L enters the eyes of a person coexisting with the robot 2, the person can instantaneously feel glare and show a defense reaction by blinking. Therefore, by setting the wavelength of the laser beam L in the visible region, the robot system 1 is safer.

The optical system 44 includes a collimator lens 441 configured to collimate the laser beam L emitted from the laser beam source 42 and a rod lens 442 (a lens) configured to change the laser beam L collimated by the collimator lens 441 to a line shape extending in a direction parallel to a turning axis J explained below (a paper surface depth direction of FIG. 2).

The optical scanner 45 has a function of scanning the laser beam L changed to the line shape by the rod lens 442. Consequently, it is possible to two-dimensionally (planarly) diffuse and irradiate the laser beam L. When the laser beam L is two-dimensionally diffused in this way, power per unit area decreases as an optical path of the laser beam L is longer. The optical scanner 45 is not particularly limited. For example, an MEMS (Micro Electro Mechanical Systems), a Galvano mirror, and a polygon mirror can be used.

The optical scanner 45 in this embodiment is configured by the MEMS. As shown in FIG. 3, the optical scanner 45 includes a movable section 451, a supporting section 452 configured to support the movable section 451, a beam section 453 configured to couple the movable section 451 and the supporting section 452 and enable the movable section 451 to turn around the turning axis J with respect to the supporting section 452, a mirror 454 disposed on the front surface (the surface on the paper surface near side of FIG. 3) of the movable section 451 and configured to reflect the laser beam L, a permanent magnet 455 provided on the rear surface (the surface on the paper surface depth side of FIG. 3) of the movable section 451, and a coil 456 disposed to be opposed to the permanent magnet 455. The movable section 451, the supporting section 452, and the beam section 453 are, for example, integrally formed from a silicon substrate.

Such an optical scanner 45 is disposed such that the turning axis J substantially coincides with an extending direction of the laser beam L having the line shape. When a driving signal (an alternating voltage) is applied to the coil 456, the movable section 451 turns around the turning axis J. Consequently, the laser beam L having the line shape is scanned.

The optical scanner 45 includes a piezoresistor 457 provided in the supporting section 452. A resistance value of the piezoresistor 457 changes according to stress generated in the supporting section 452 as the movable section 451 turns around the turning axis J. Therefore, the optical scanner 45 can detect a turning angle of the movable section 451 based on a resistance value change of the piezoresistor 457. The piezoresistor 457 can be formed by doping (diffusing or injecting) impurities such as phosphorus or boron in a silicon substrate.

The laser emitter 41 is explained above. In such a laser emitter 41, as explained above, the laser beam L is two-dimensionally diffused by the optical system 44 and the optical scanner 45. Therefore, the intensity of the laser beam L, that is, an energy amount per unit time in regions on which the laser beam L can be irradiated decreases with distance from the laser emitter 41, in other words, as the optical path length of the laser beam L increases. By adopting such a configuration, it is possible to more effectively prevent the high-intensity laser beam L from entering the eyes of the person coexisting with the robot 2. Therefore, the robot system 1 is safe for the person coexisting with the robot 2.

The configuration of the laser emitter 41 is not particularly limited if the laser emitter 41 can project the predetermined projection pattern P on the object W. For example, in this embodiment, the laser beam L is diffused in the line shape by the optical system 44. However, not only this, but the laser beam L may be diffused in the line shape using an MEMS or a Galvano mirror. That is, the laser beam L may be two-dimensionally scanned using two optical scanners 45. For example, the laser beam L may be two-dimensionally scanned using an MEMS of a gimbal type having a two-axis degree of freedom.

The image capturing device 47 images a state in which the projection pattern P is projected on at least one object W. That is, the image capturing device 47 images at least one object W including the projection pattern P. As shown in FIG. 2, the image capturing device 47 is configured by, for example, a camera 471 including an imaging device 472 such as a CMOS image sensor or a CCD image sensor and a condensing lens 473.

As shown in FIG. 2, the controller 48 includes a human detection information receiver 481 configured to receive information from the human detection sensor 3, a laser emission controller 482 configured to control driving of the laser beam source 42, an optical scanning controller 483 configured to control driving of the optical scanner 45, an image capturing controller 484 configured to control driving of the image capturing device 47, and a point-group-data generator 485 configured to generate, based on image data acquired by the image capturing device 47, three-dimensional point group data of a region including the object W.

The controller 48 is configured from, for example, a computer. The controller 48 includes a processor (a CPU) configured to process information, a memory communicably connected to the processor, and an external interface. Various computer programs executable by the processor are saved (stored) in the memory. The processor can read and execute the various computer programs and the like stored in the memory.

The optical scanning controller 483 controls driving of the optical scanner 45 by applying a driving signal to the coil 456. The optical scanning controller 483 detects a turning angle of the movable section 451 based on a resistance value change of the piezoresistor 457. The laser emission controller 482 controls driving of the laser beam source 42 by applying a driving signal to the laser beam source 42. The laser emission controller 482 emits the laser beam L from the laser beam source 42 in synchronization with turning of the movable section 451 detected by the optical scanning controller 483 and forms, on the object W, for example, the projection pattern P of a stripe pattern represented by light and shade shown in FIG. 4.

The laser emission controller 482 can select, as power of the laser beam L, first power and second power lower than the first power. The laser emission controller 482 may be configured to be capable of further selecting third power lower than the second power, fourth power lower than the third power, and the like. That is, the number of powers selected by the laser emission controller 482 is not particularly limited.

The laser emission controller 482 emits the laser beam L from the laser beam source 42 after the turning of the movable section 451 is started. That is, time when the laser beam L is emitted from the laser beam source 42 is later than time when the turning of the movable section 451 is started. For example, if the laser beam L is emitted in a state in which the movable section 451 is not turning and a posture of the movable section 451 is fixed, the laser beam L is continuously irradiated on the same part. If the eyes of a person coexisting with the robot 2 are present on an optical path of the laser beam L, the laser beam L continuously enters the eyes of the person. The laser beam L is likely to adversely affect the eyes depending on, for example, the intensity of the laser beam L. On the other hand, if the turning of the movable section 451 is started earlier than the emission of the laser beam L, the laser beam L is scanned and is not continuously irradiated on the same part. Therefore, the problem described above less easily occurs. The robot system 1 is safer for the person coexisting with the robot 2.

The laser emission controller 482 may determine, based on whether the optical scanning controller 483 is applying a driving signal to the coil 456, whether the movable section 451 is turning. However, it is more desirable to determine, based on a resistance value change of the piezoresistor 457, whether the movable section 451 is turning. For example, it is likely that, because of a failure, disconnection, or the like of the optical scanner 45, turning of the movable section 451 is not started, although the driving signal is applied to the coil 456. On the other hand, based on the resistance value change of the piezoresistor 457, since the resistance value of the piezoresistor 457 does not change unless the turning of the movable section 451 is started, it is possible to surely confirm that the turning of the movable section 451 is started. Therefore, the robot system 1 is safer for the person coexisting with the robot 2.

The image capturing controller 484 controls driving of the image capturing device 47 (the camera 471). The projection pattern P is projected four times while being shifted by $\pi/2$ at a time. Every time the projection pattern P is projected, the image capturing controller 484 images, with the image capturing device 47, the object W on which the projection pattern P is projected. However, the number of times of projection of the projection pattern P is not particularly limited and only has to be the number of times with which a phase can be calculated from an imaging result. The image capturing controller 484 may perform the same projection and imaging using a pattern having a large pitch or a pattern having a small pitch and perform phase connection. A measurement range and resolution can be improved as types of pitches are increased. However, since the number of times of imaging increases, a time required for acquiring image data increases and operation efficiency of the robot 2 is deteriorated. Therefore, the number of times of projection of the projection pattern P only has to be set as appropriate according to a balance of accuracy and a measurement range of three-dimensional measurement and the operation efficiency of the robot 2.

The image capturing controller 484 has, as image capturing modes of the image capturing device 47, a first image capturing mode for imaging the object W in a first exposure time and a second image capturing mode for imaging the object W in a second exposure time longer than the first exposure time. The image capturing controller 484 can select these image capturing modes. The image capturing controller 484 may have, as the image capturing modes of the image capturing device 47, a third image capturing mode for imaging the object W in a third exposure time longer than the second exposure time, a fourth image capturing mode for imaging the object W in a fourth exposure time longer than the third exposure time, and the like. That is, the number of image capturing modes of the image capturing controller 484 is not particularly limited.

As explained above, the laser emission controller 482 can select, as the power of the laser beam L, the first power and the second power having laser intensity lower than the laser intensity of the first power. When the laser emission controller 482 selects the first power, the image capturing controller 484 selects the first image capturing mode. At the first power, since a sufficiently bright projection pattern P is projected, by selecting the first image capturing mode having a short exposure time, it is possible to acquire image data having appropriate brightness and contrast while suppressing so-called "white void" of an image acquired by the camera 471. On the other hand, when the laser emission controller 482 selects the second power, the image capturing controller 484 selects the second image capturing mode. At the second power, the projection pattern P darker than the projection pattern P projected at the first power is projected. Therefore, by selecting the second image capturing mode having a long exposure time, it is possible to acquire image data having appropriate brightness and contrast while suppressing so-called "black solid".

By changing the first image capturing mode and the second image capturing mode as appropriate according to the power of the laser beam L in this way, irrespective of whether the projection pattern P is projected at the first power and the second power, it is possible to acquire image data having brightness and contrast sufficient for performing the three-dimensional measurement of the object W with the camera 471.

The first exposure time and the second exposure time are not respectively particularly limited and can be set as appropriate according to brightness of the projection pattern P projected at the first power and the second power. However, for example, it is desirable to set the first exposure time and the second exposure time such that an exposure amount (intensity of light made incident on the imaging device×exposure time) is equal in the first image capturing mode and the second image capturing mode. Consequently, it is possible to further equalize the quality of the image data acquired in the first image capturing mode and the image data acquired in the second image capturing mode.

In the configuration explained above, the exposure time is changed as appropriate according to the power of the laser beam L. However, not only this, but, for example, an aperture value may be changed as appropriate according to the power of the laser beam L. For example, when the laser emission controller 482 selects the first power, the image capturing controller 484 may select a first aperture value. When the laser emission controller 482 selects the first power, the image capturing controller 484 may select a second aperture value further on an open side than the first aperture value. However, it is likely that depth of field of the camera 471 changes and, for example, defocus of an image occurs when the aperture value is changed. Therefore, it is desirable to change the exposure time as in this embodiment.

The point-group-data generator 485 generates, using a phase shift method, three-dimensional point group data of a region including the object W from a plurality of image data acquired by the image capturing device 47. The three-dimensional point group data generated by the point-group-data generator 485 is transmitted to the host computer 6. The three-dimensional point group data is, for example, data in which three-dimensional coordinates of points on image data are recorded.

The host computer 6 includes a calculator 61 configured to calculate, based on the three-dimensional point group data received from the point-group-data generator 485, three-dimensional information including a posture, a position (a space coordinate), and the like of the object W. For example, information concerning the shape of the object W is stored in the calculator 61. It is possible to calculate a posture and a position of the object W by matching the three-dimensional point group data and the shape of the object W. However, not only this, but the shape of the object W may be acquired from the three-dimensional point group data.

The host computer 6 generates a position command for the robot 2 from the calculated three-dimensional information of the object W and transmits the generated position command to the robot controller 5. The robot controller 5 respectively independently drives the first to sixth driving devices 251 to 256 based on the position command received from the host computer 6 and moves the first to sixth arms 221 to 226 to instructed positions.

In this embodiment, the host computer 6 includes the calculator 61. However, not only this, but the three-dimensional measuring device 4 or the robot controller 5 may include the calculator 61 or another device may include the calculator 61.

The configuration of the robot system 1 is explained above. A control method for the robot system 1 is explained below. As shown in FIG. 5, the robot system 1 includes a maximum movable area S1, which is a region where the distal end of the end effector 24 can be located by driving of the robot 2, and a high-intensity laser beam irradiation area S2, which is larger than the maximum movable area S1 and is a region where the intensity of the laser beam L emitted at the first power can be intensity higher than predetermined intensity. In the robot system 1, a laser beam power control area S3 (a detection range) larger than the high-intensity laser beam irradiation area S2 and including the entire region of the high-intensity laser beam irradiation area S2 is set. In FIG. 5, for convenience of explanation, the areas S1 to S3 are respectively indicated by circles. However, the shapes of the areas are not particularly limited.

The "predetermine intensity" is not particularly limited. However, for example, the "predetermined intensity" can be set to intensity of a laser beam L1 not affecting a human body or can be set to intensity of the laser beam L at the second power. The laser beam power control area S3 (the detection range) is a range equal to or smaller than a predetermined distance from the laser emitter 41. The laser beam power control area S3 includes an irradiation range in which the laser beam L is irradiated.

First, a case is explained in which a person is absent in the laser beam power control area S3, that is, the human detection information receiver 481 receives a non-detection signal from the human detection sensor 3. "A person is absent" means that the entire person or a part of the person is absent in the laser beam power control area S3. In this case, since the person is absent in the laser beam power control area S3, it is almost unlikely that the high-intensity laser beam L enters the eyes of the person. Therefore, when the three-dimensional measurement of the object W is performed, the laser emission controller 482 emits the laser beam L at the first power and the image capturing controller 484 images the object W in the first image capturing mode. When the person is absent in the laser beam power control area S3, it is almost unlikely that the robot 2 and the person collide with each other. Therefore, the robot controller 5 drives the first to sixth arms 221 to 226 at normal moving speed.

Subsequently, a case is explained in which a person is present in the laser beam power control area S3, that is, the human detection information receiver 481 receives a detection signal from the human detection sensor 3. "A person is present" means that the entire person or a part of the person is present in the laser beam power control area S3. In this case, since the person is present in the laser beam power control area S3, the laser beam L is likely to enter the eyes of the person. Therefore, when the three-dimensional measurement of the object W is performed, the laser emission controller 482 emits the laser beam L at the second power having lower intensity than the first power and the image capturing controller 484 images the object W in the second image capturing mode having a longer exposure time than the first image capturing mode. When the person is present in the laser beam power control area S3, the robot 2 and the person are likely to collide with each other. Therefore, the robot controller 5 drives the first to sixth arms 221 to 226 at moving speeds (angular velocities) lower than the normal moving speed described above.

In this way, when the person is absent in the laser beam power control area S3, the object W is imaged in a short exposure time using the laser beam L having high intensity compared with when the person is present in the laser beam power control area S3. Consequently, it is possible to reduce a time required for the three-dimensional measurement of the object W and improve the operation efficiency (processing speed) of the robot 2. On the other hand, when the person is present in the laser beam power control area S3, the object W is imaged in a long exposure time using the laser beam L having low intensity compared with when the person is absent in the laser beam power control area S3. Consequently, the time required for the three-dimensional measurement of the object W increases and the operation efficiency of the robot 2 is deteriorated compared with when the person is absent in the laser beam power control area S3. However, the power of the laser beam L is reduced to a level that is safe even if the laser beam L enters the eyes of the person present in the laser beam power control area S3. Therefore, it is possible to secure safety of the person.

When the person is present in the laser beam power control area S3, moving speeds of the first to sixth arms 221 to 226 are respectively reduced compared with when the person is absent in the laser beam power control area S3. Consequently, even if the robot 2 and the person come into contact, it is possible to reduce a shock of the contact. Therefore, the robot system 1 is safe for the person present in the laser beam power control area S3.

However, not only this, but the laser emission controller 482 may stop the emission of the laser beam L when the person is present in the laser beam power control area S3. When the person is present in the laser beam power control area S3, the image capturing controller 484 may image the object W in the first image capturing mode. Consequently, the quality of image data is low and the accuracy of the three-dimensional measurement of the object W is deteriorated compared with when the object W is imaged in the second image capturing mode. However, it is possible to reduce the time required for the three-dimensional measurement of the object W. Therefore, it is possible to improve the operation efficiency (the processing speed) of the robot 2. When the person is present in the laser beam power control area S3, the robot controller 5 may respectively stop the driving of the first to sixth arms 221 to 226. Consequently, the robot system 1 is safer for the person present in the laser beam power control area S3.

Subsequently, a case is explained in which a signal received by the human detection information receiver 481 changes while the three-dimensional measurement of the object W is performed. "While the three-dimensional measurement is performed" can be set to, for example, a period from when emission of the laser beam L is started in order to acquire first image data until when last (in this embodiment, fourth) image data is acquired and the emission of the laser beam L is stopped.

First, a case is explained in which the person retracts from the laser beam power control area S while the three-dimensional measurement of the object W is performed, that is, a signal received by the human detection information receiver 481 changes from a detection signal to a non-detection signal while the three-dimensional measurement of the object W is performed. In this case, the laser emission controller 482 maintains the power of the laser beam L at the second power until the three-dimensional measurement of the object W ends. The image capturing controller 484 maintains the image capturing mode of the camera 471 in the second image capturing mode. That is, even if the person retracts from the laser beam power control area S3 during the three-dimensional measurement, the power of the laser beam L is changed to the first power and the image capturing mode of the camera 471 is not changed to the first image capturing mode according to the retraction. The power of the laser beam L and the exposure time of the camera 471 are maintained until the three-dimensional measurement of the object W ends.

When the power of the laser beam L and the exposure time of the camera 471 are changed while the three-dimensional measurement of the object W is performed, it is likely that, because of the change, a difference in brightness and contrast occurs between image data acquired before the change and image data acquired after the change, distortion and void occur in the projection pattern P when the power of the laser beam L is changed, and the accuracy of the three-dimensional measurement of the object W is deteriorated. On the other hand, when the power of the laser beam L and the exposure time of the camera 471 are maintained, the problems described above are unlikely to occur. It is possible to more accurately perform the three-dimensional measurement of the object W.

Naturally, for example, when the problems described above may occur or when the problems describe above do not occur (e.g., when exposure amounts are equal in the first image capturing mode and the second image capturing mode), according to a change of the signal received by the human detection information receiver 481 from the detection signal to the non-detection signal, the power of the laser beam L may be changed from the second power to the first power, the image capturing mode of the camera 471 may be changed from the second image capturing mode to the first image capturing mode, and the three-dimensional measurement of the object W may be continued under conditions after the change. Consequently, compared with when the power of the laser beam L and the exposure time of the camera 471 are maintained, the time required for the three-dimensional measurement of the object W decreases and the operation efficiency of the robot 2 is improved.

As another kind of control, when the person retracts from the laser beam power control area S3, the three-dimensional measurement of the object W may be stopped, the power of the laser beam L may be changed from the second power to the first power, the image capturing mode of the camera 471 may be changed from the second image capturing mode to the first image capturing mode, and then the three-dimensional measurement of the object W may be performed again from the beginning. Consequently, depending on a state of progress of the measurement up to that point, compared with when the power of the laser beam L and the exposure time of the camera 471 are maintained as explained above, the time required for the three-dimensional measurement of the object W decreases and the operation efficiency of the robot 2 is improved.

Subsequently, a case is explained in which the person enters the laser beam power control area S3 while the three-dimensional measurement of the object W is performed, that is, the signal received by the human detection information receiver 481 changes from the non-detection signal to the detection signal while the three-dimensional measurement of the object W is performed. In this case, when the person enters the laser beam power control area S3, according to the entrance, the power of the laser beam L is changed from the first power to the second power, the image capturing mode of the camera 471 is changed from the first image capturing mode to the second image capturing mode, and the three-dimensional measurement of the object W is continued under conditions after the change. Consequently, the high-intensity laser beam L is prevented from entering the eyes of the person present in the laser beam power control area S3. Therefore, the robot system 1 is safer. Since the three-dimensional measurement of the object W can be continued, for example, compared with when the three-dimensional measurement is performed again, the time required for the three-dimensional measurement of the object W decreases and the operation efficiency of the robot 2 is improved.

As another kind of control, the laser emission controller 482 may stop the emission of the laser beam L when the person enters the laser beam power control area S3. Consequently, the high-intensity laser beam L is prevented from entering the eyes of the person present in the laser beam power control area S3. Therefore, the robot system 1 is safer. When the laser emission controller 482 has the third power, the fourth power, and the like as explained above, the laser emission controller 482 may switch the power of the laser beam L to the third and fourth powers when the person enters the laser beam power control area S3.

The size of the laser beam power control area S3 is not particularly limited. However, the size of the laser beam power control area S3 is set such that a time T1 from when the person enters the laser beam power control area S3 until the person reaches the high-intensity laser beam irradiation area S2 is longer than a time T2 from when the person enters the laser beam power control area S3 until the power of the laser beam L is switched from the first power to the second power or the emission of the laser beam L is stopped. Consequently, it is possible to effectively prevent a situation in which, while the power of the laser beam L is changed, the person enters the high-intensity laser beam irradiation area S2 and the high-intensity laser beam L enters the eyes of the person. The time T1 can be calculated as appropriate based on, for example, moving speed and a moving route of the person at work.

The robot system 1 is explained in detail above. As explained above, such a robot system 1 includes the robot 2, the human detection sensor 3 configured to detect a person present in the laser beam power control area S3 (the detection range), the three-dimensional measuring device 4 configured to perform the three-dimensional measurement of the object W using the laser beam L, and the robot controller 5 configured to control the operation of the robot 2 based on a measurement result by the three-dimensional measuring device 4. The three-dimensional measuring device 4 includes the laser emitter 41 configured to irradiate a region including the object W with the laser beam L, the laser emission controller 482 configured to control the power of the laser beam L irradiated from the laser emitter 41 to the first power and the second power lower than the first power, and the image capturing device 47 configured to image the object W, on which the laser beam L is irradiated, and acquire image data. When information indicating that a person is absent in the laser beam power control area S3 is output from the human detection sensor 3, the laser emission controller 482 controls the power of the laser beam L to the first power. When the person is absent in the laser beam power control area S3, the laser beam L is unlikely to enter the eyes of the user. Therefore, when the laser beam L is emitted at the first power, compared with when the laser beam L is emitted at the second power, it is possible to project a brighter projection pattern P on the object W. Accordingly, a time required for the three-dimensional measurement decreases. Therefore, processing speed of the robot 2 is improved. On the other hand, when a signal indicating that the person is present in the laser beam power control area S3 is output from the human detection sensor 3, the laser emission controller 482 controls the power to the second power. Consequently, it is possible to reduce the power of the laser beam L to a level that is safe even if the laser beam L enters the eyes of the person present in the laser beam power control area S3. The robot system 1 is safe for the person present in the laser beam power control area S3.

As explained above, the three-dimensional measuring device 4 includes the human detection information receiver 481 configured to receive information from the human detection sensor 3 that detects a person present in the laser beam power control area S3 (the detection range), the laser emitter 41 configured to irradiate a region including the object W with the laser beam L, the laser emission controller 482 configured to control the power of the laser beam L irradiated from the laser emitter 41 to the first power and the second power lower than the first power, the image capturing device 47 configured to image the object W, on which the laser beam L is irradiated, and acquire image data, and the point-group-data generator 485 configured to generate, based on the image data, three-dimensional point group data of the region including the object W. When the human detection information receiver 481 receives, from the human detection sensor 3, the first information indicating that the person is absent in the laser beam power control area S3, the laser emission controller 482 controls the power of the laser beam L1 to the first power. When the person is absent in the laser beam power control area S3, the laser beam L is unlikely to enter the eyes of the person. Therefore, when the laser beam L is emitted at the first power, compared with when the laser beam L is emitted at the second power, it is possible to project a brighter projection pattern P on the object W. Accordingly, a time required for the three-dimensional measurement decreases. Therefore, the processing speed of the robot 2 is improved.

As explained above, when the human detection information receiver 481 receives, from the human detection sensor 3, the second information indicating that the person is present in the laser beam power control area S3, the laser emission controller 482 controls the power of the laser beam L to the second power. Consequently, it is possible to reduce the power of the laser beam L to a level that is safe even if the laser beam L enters the eyes of the person present in the laser beam power control area S3. The robot system 1 is safe for the person present in the laser beam power control area S3.

As explained above, the laser emission controller 482 starts the irradiation of the laser beam L at the second power and, when the human detection information receiver 481 receives the first information before the irradiation of the laser beam L is completed, maintains the irradiation of the laser beam L at the second power. That is, even if a signal received by the human detection information receiver 481 during the three-dimensional measurement changes from the detection signal to the non-detection signal, the laser emission controller 482 maintains the power of the laser beam L and the exposure time of the camera 471 until the three-dimensional measurement of the object W ends. When the power of the laser beam L and the exposure time of the camera 471 are changed during the measurement, it is likely that, because of the change, for example, a difference in brightness and contrast occurs in image data, a difference in brightness and contrast occurs between image data acquired before the change and image data acquired after the change, distortion and void occur in the projection pattern P when the power of the laser beam L is switched, and the accuracy of the three-dimensional measurement of the object W is deteriorated. Therefore, when the power of the laser beam L and the exposure time of the camera 471 are maintained, the problems described above are unlikely to occur. It is possible to more accurately perform the three-dimensional measurement of the object W.

As explained above, the laser emission controller 482 starts the irradiation of the laser beam L at the first power and, when the human detection information receiver 481 receives the second information before the irradiation of the laser beam L is completed, switches the power of the laser beam L to the second power or stops the irradiation of the laser beam L. Consequently, the robot system 1 is safe for the person present in the laser beam power control area S3.

As explained above, the controller 48 includes the image capturing controller 484 configured to control the image capturing mode of the image capturing device 47. The image capturing controller 484 has, as the image capturing modes, the first image capturing mode in which the exposure time of the image capturing device 47 is the first exposure time and the second image capturing mode in which the exposure time of the image capturing device 47 is longer than the first exposure time. The image capturing controller 484 controls the image capturing mode to the first image capturing mode when the power of the laser beam L is the first power. In this way, when the high-intensity laser beam L is irradiated, by selecting the short exposure time, it is possible to acquire image data having appropriate brightness and contrast. Therefore, it is possible to more highly accurately perform the three-dimensional measurement of the object W.

As explained above, the image capturing controller 484 controls the image capturing mode to the second image capturing mode when the power of the laser beam L is the second power. In this way, when the low-intensity laser beam L is irradiated, it is possible to acquire image data having appropriate brightness and contrast by selecting the long exposure time. Therefore, it is possible to more highly accurately perform the three-dimensional measurement of the object W.

As explained above, the laser emitter 41 includes the mirror 454 configured to diffuse the laser beam L. By diffusing the laser beam L in this way, the intensity of the laser beam L decreases with distance from the laser emitter 41. Therefore, the three-dimensional measuring device 4 is safer.

As explained above, the laser emitter 41 includes the rod lens 442 functioning as the lens that diffuses the laser beam L. By diffusing the laser beam L in this way, the intensity of the laser beam L decreases with distance from the laser emitter 41. Therefore, the three-dimensional measuring device 4 is safer.

The controller 48 includes the human detection information receiver 481 configured to receive information from the human detection sensor 3 that detects a person present in the laser beam power control area S3 and the laser emission controller 482 configured to control the power of the laser beam L irradiated from the laser emitter 41 to the first power and the second power lower than the first power. When the human detection information receiver 481 receives, from the human detection sensor 3, the first information indicating that the person is absent in the laser beam power control area S3, the laser emission controller 482 controls the power of the laser beam L to the first power. When the person is absent in the laser beam power control area S3, the laser beam L is unlikely to enter the eyes of the person. Therefore, when the laser beam L is emitted at the first power, compared with when the laser beam L is emitted at the second power, it is possible to project the brighter projection pattern P on the object W. Accordingly, the time required for the three-dimensional measurement decreases. Therefore, the operation efficiency of the robot 2 is improved.

Second Embodiment

Figure 6:
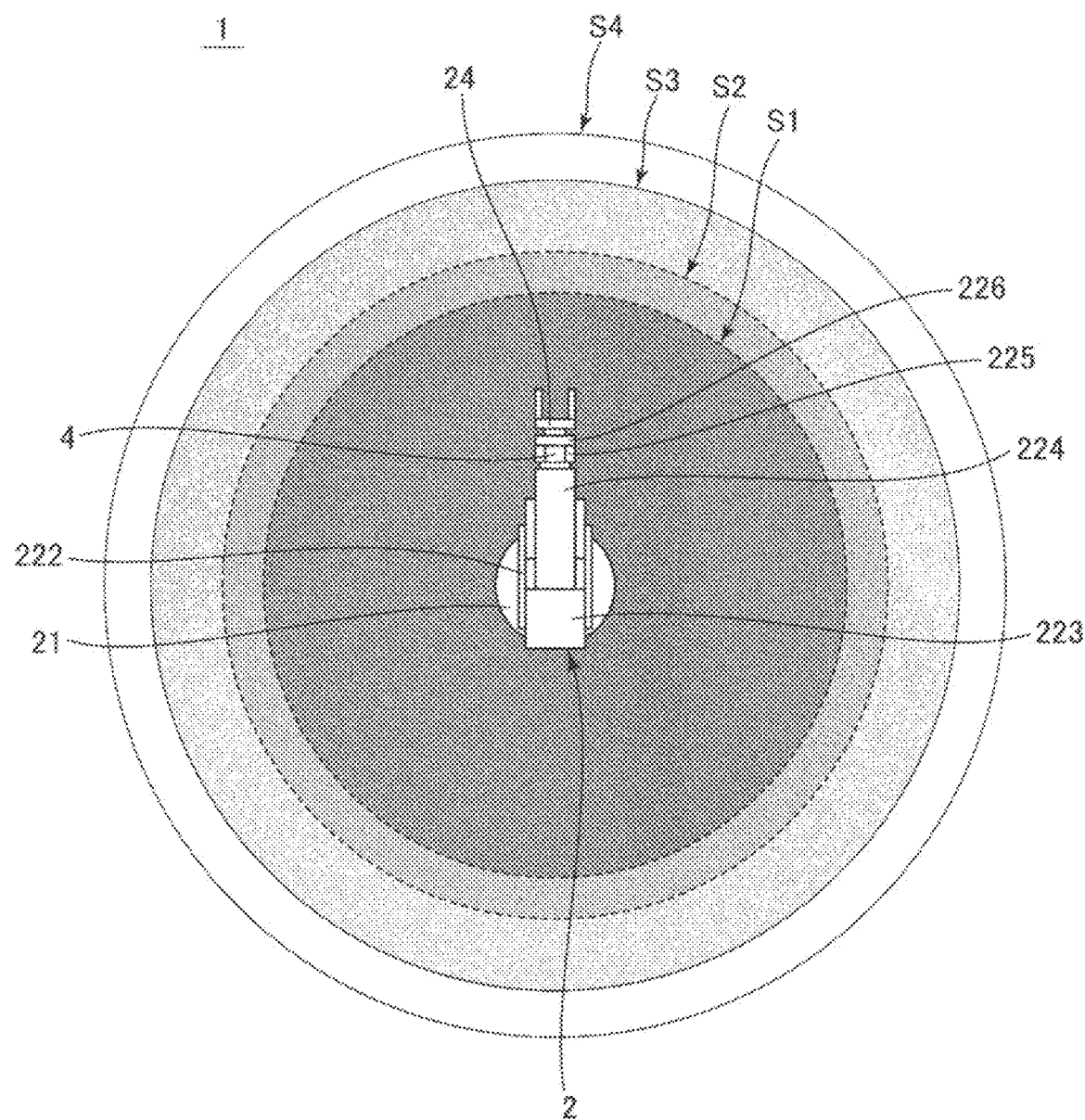
FIG. 6 is a plan view showing a detection range set in a robot system according to a second embodiment of the present disclosure.

FIG. 6 is a plan view showing a detection range set in a robot system according to a second embodiment of the present disclosure.

In the following explanation, differences from the first embodiment are mainly explained concerning the robot system in the second embodiment. Concerning similarities, explanation is omitted. The robot system 1 in the second embodiment is substantially the same as the robot system 1 in the first embodiment except that the laser beam power control area S3 and a robot driving control area S4 wider than the laser beam power control area S3 are set as a detection range. In FIG. 6, the same components as the components in the first embodiment are denoted by the same reference numerals and signs.

As shown in FIG. 6, the robot system 1 includes the maximum movable area S1, which is a region where the distal end of the end effector 24 can be located by driving of the robot 2, and the high-intensity laser beam irradiation area S2, which is a region where the intensity of the laser beam L emitted at the first power can be intensity higher than predetermined intensity. In the robot system 1, the laser beam power control area S3 for controlling power of the laser beam L and the robot driving control area S4 for controlling driving of the robot 2 are set as the detection range. The high-intensity laser beam irradiation area S2 is larger than the maximum movable area S1 and includes the entire region of the maximum movable area S1.

A driving method for the robot system 1 having such a configuration is explained. First, a case is explained in which the human detection information receiver 481 receives, from the human detection sensor 3, a signal indicating that a person is absent in the robot driving control area S4. In this case, since the person is absent in the robot driving control area S4, the robot controller 5 drives the first to sixth arms 221 to 226 at normal moving speed.

Subsequently, a case is explained in which the human detection information receiver 481 receives, from the human detection sensor 3, a signal indicating that the person is present in the robot driving control area S4. In this case, it is likely that the person is present near the robot 2 and the person and the robot 2 come into contact with each other depending on a movement of the person. Therefore, the robot controller 5 drives the first to sixth arms 221 to 226 at moving speed lower than the normal moving speed described above.

When the person is present in the robot driving control area S4 in this way, compared when the person is absent in the robot driving control area S4, the moving speed of the first to sixth arms 221 to 226 is reduced. Consequently, even if the robot 2 and the person come into contact with each other, it is possible to reduce a shock of the contact. Therefore, the robot system 1 is safe for the person present in the robot driving control area S4.

The control methods when the person is present in the laser beam power control area S3 and when the person is absent in the laser beam power control area S3 are the same as the control methods in the first embodiment. According to such a second embodiment, it is possible to exert the same effects as the effects in the first embodiment explained above.

Third Embodiment

Figure 7:
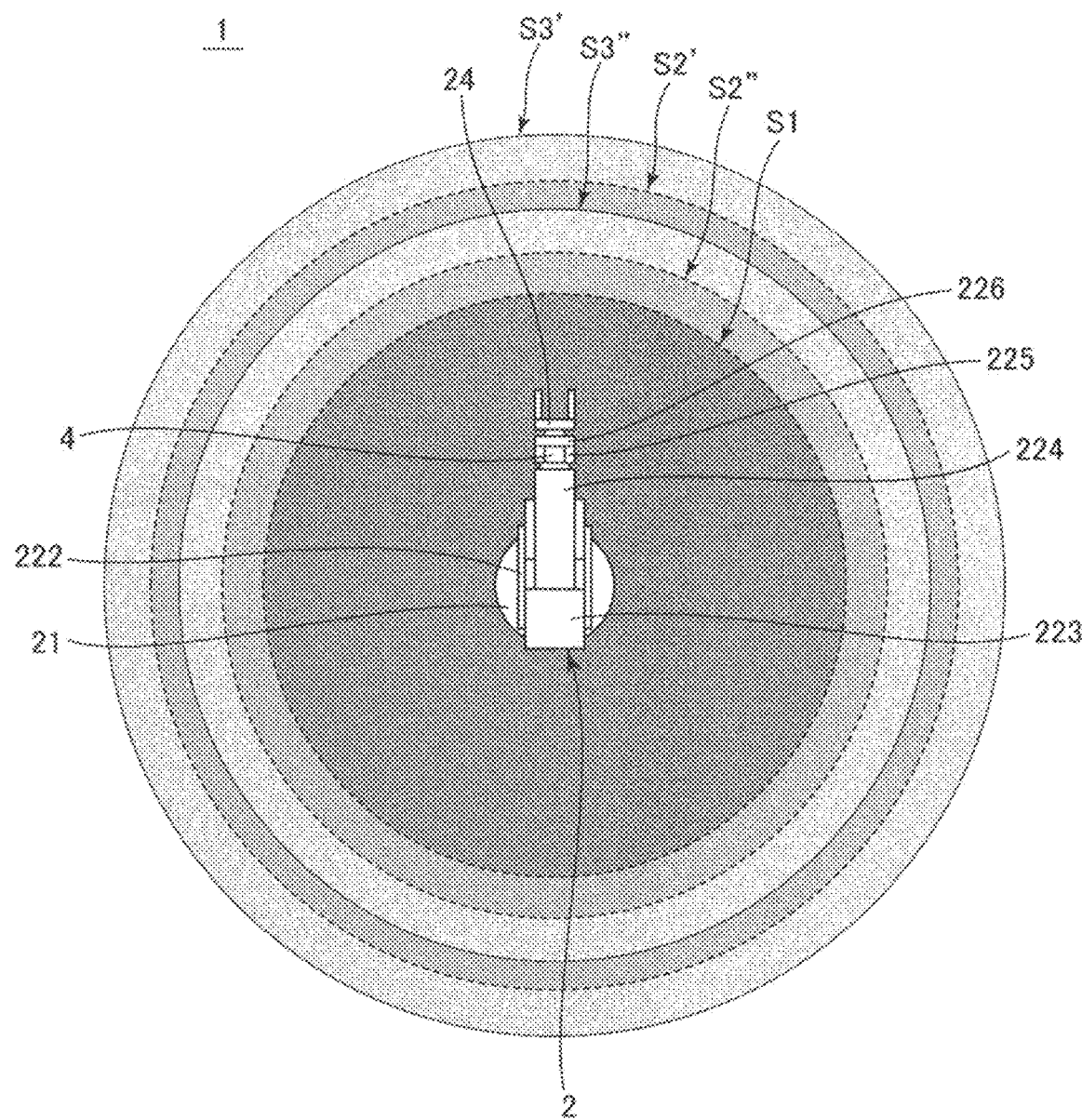
FIG. 7 is a plan view showing a detection range set in a robot system according to a third embodiment of the present disclosure.

FIG. 7 is a plan view showing a detection range set in a robot system according to a third embodiment of the present disclosure.

In the following explanation, differences from the embodiments explained above are mainly explained concerning the robot system in the third embodiment. Concerning similarities, explanation is omitted. The robot system 1 in the third embodiment is substantially the same as the robot system 1 in the first embodiment except that the power of the laser beam L is the first power to the third power and the laser beam power control area S3 is divided into two areas. In FIG. 7, the same components as the components in the embodiments explained above are denoted by the same reference numerals and signs.

In the robot system 1 in this embodiment, the laser emission controller 482 has, as power of the laser beam L, first power, second power lower than the first power, and third power lower than the second power. The laser emission controller 482 can select these powers. On the other hand, the image capturing controller 484 has, as an image capturing mode of the image capturing device 47, a first image capturing mode for imaging the object W in a first exposure time, a second image capturing mode for imaging the object W in a second exposure time longer than the first exposure time, and a third image capturing mode for imaging the object W in a third exposure time longer than the second exposure time. The image capturing controller 484 can select these image capturing modes.

As shown in FIG. 7, the robot system 1 includes the maximum movable area S1, which is a region where the distal end of the end effector 24 can be located by driving of the robot 2, a high-intensity laser beam irradiation area S2', which is a region where the intensity of the laser beam L emitted at the first power can be intensity higher than predetermined intensity, and a high-intensity laser beam irradiation area S2", which is a region where the intensity of the laser beam L emitted at the second power can be intensity higher than the predetermined intensity. In the robot system 1, laser beam power control areas S3' and S3" for controlling the power of the laser beam L are set as the detection range. The laser beam power control area S3' is larger than the high-intensity laser beam irradiation area S2' and includes the entire region of the high-intensity laser beam irradiation area S2'. The laser beam power control area S3" is larger than the high-intensity laser beam irradiation area S2" and includes the entire region of the high-intensity laser beam irradiation area S2".

A driving method for the robot system 1 having such a configuration is explained. First, a case is explained in which the human detection information receiver 481 receives, from the human detection sensor 3, a signal indicating that a person is absent in the laser beam power control area S3'. In this case, since the person is absent in the laser beam power control area S3', it is almost unlikely that the high-intensity laser beam L enters the eyes of the person. Therefore, when the three-dimensional measurement of the object W is performed, the laser emission controller 482 emits the laser beam L at the first power. The image capturing controller 484 images the object W in the first image capturing mode.

Subsequently, a case is explained in which the human detection information receiver 481 receives, from the human detection sensor 3, a signal indicating that a person is present in the laser beam power control area S3'. In this case, since the person is present in the laser beam power control area S3', when the laser beam L is emitted at the first power, the high-intensity laser beam L is likely to enter the eyes of the person. Therefore, when the three-dimensional measurement of the object W is performed, the laser emission controller 482 emits the laser beam L at the second power having lower intensity than the first power. The image capturing controller 484 images the object W in the second image capturing mode having a longer exposure time than the first image capturing mode.

Subsequently, a case is explained in which the human detection information receiver 481 receives, from the human detection sensor 3, a signal indicating that a person is present in the laser beam power control area S3". In this case, since the person is present in the laser beam power control area S3", even in driving at the second power, the high-intensity laser beam L is likely to enter the eyes of the person. Therefore, when the three-dimensional measurement of the object W is performed, the laser emission controller 482 emits the laser beam L at the third power having lower intensity than the second power. The image capturing controller 484 images the object W in the third image capturing mode having a longer exposure time than the second image capturing mode.

According to such a third embodiment, it is possible to exert the same effects as the effects in the first embodiment explained above.

Fourth Embodiment

Figure 8:
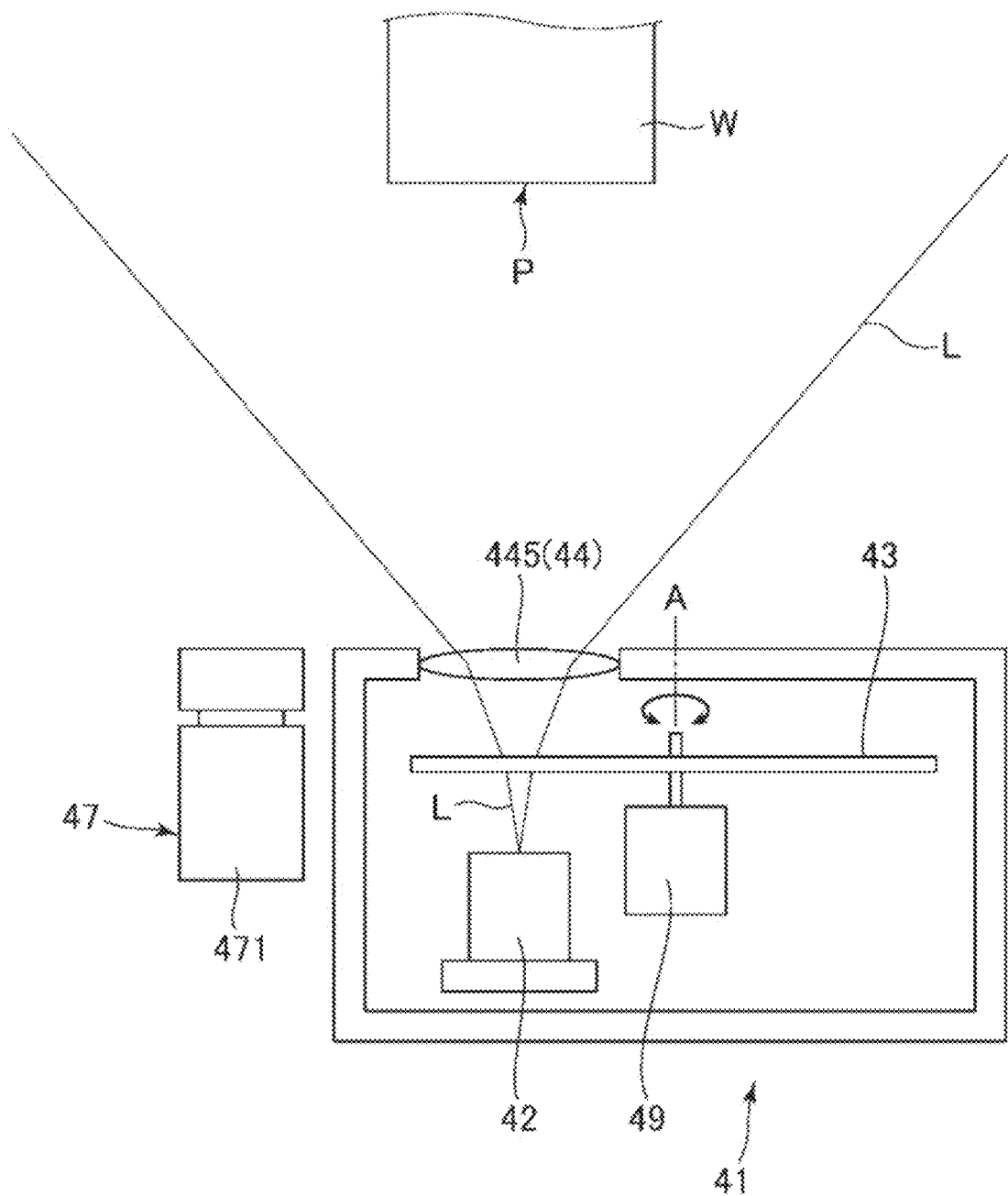
FIG. 8 is a diagram showing an overall configuration of a laser emitter included in a robot system according to a fourth embodiment of the present disclosure.
Figure 9:
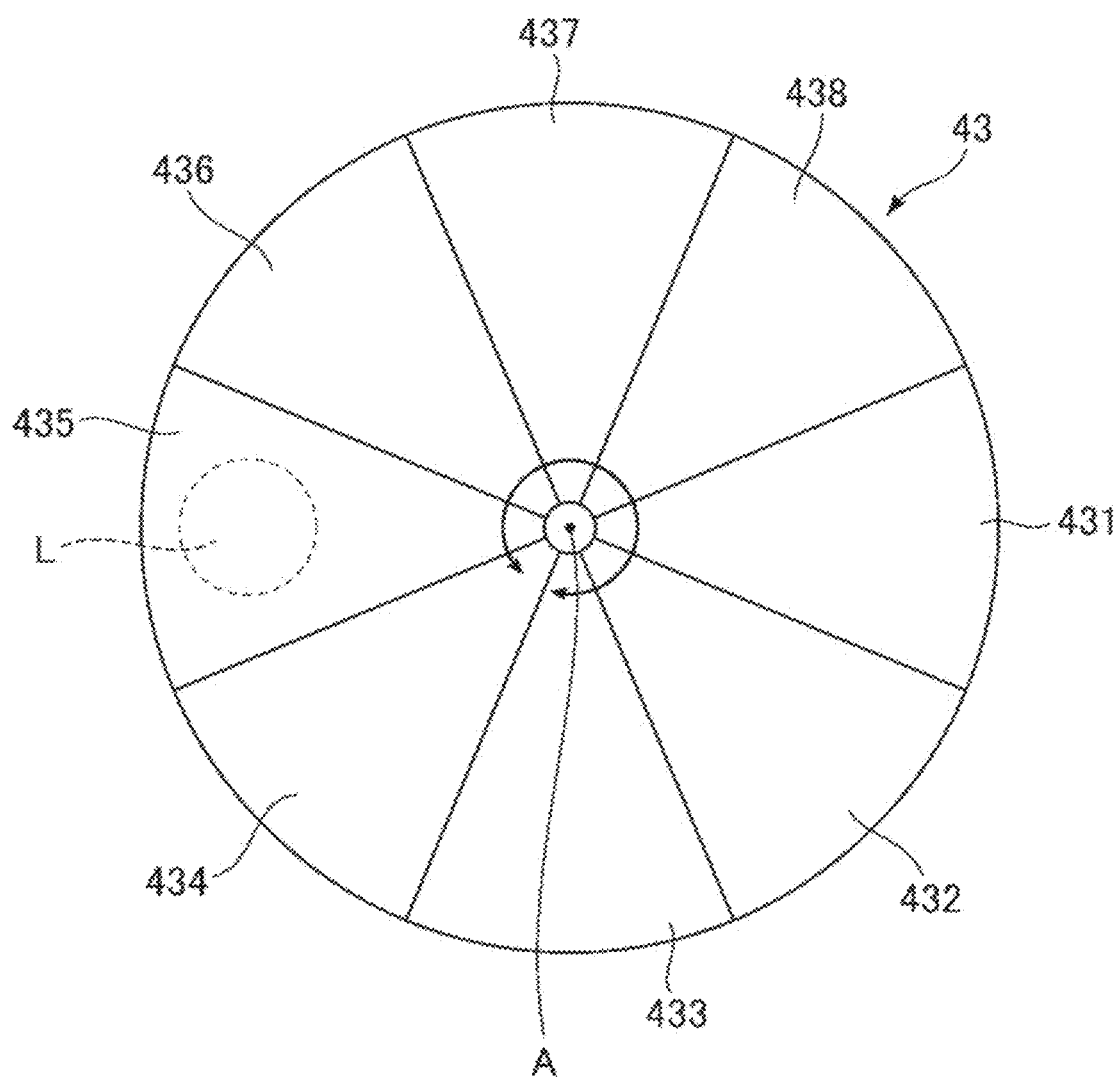
FIG. 9 is a plan view showing a diffractive optical element included in the laser emitter shown in FIG. 8.

FIG. 8 is a diagram showing an overall configuration of a laser emitter of a robot system according to a fourth embodiment of the present disclosure. FIG. 9 is a plan view showing a diffractive optical element included in the laser emitter shown in FIG. 8.

In the following explanation, differences from the embodiments explained above are mainly explained concerning the robot system in the fourth embodiment. Concerning similarities, explanation is omitted. The robot system 1 in the fourth embodiment is substantially the same as the robot system 1 in the first embodiment explained above except that the configuration of the laser emitter 41 is different. In FIG. 8, the same components as the components in the embodiments explained above are denoted by the same reference numerals and signs.

As shown in FIG. 8, the laser emitter 41 in this embodiment includes the laser beam source 42 configured to emit the laser beam L, the optical system 44 including a projection lens 445, a diffractive optical element 43 located between the laser beam source 42 and the projection lens 445, and an actuator 49 configured to rotate the diffractive optical element 43 around a center axis A. As shown in FIG. 9, the diffractive optical element 43 includes diffraction gratings 431 to 438 of eight patterns disposed around the center axis A. Predetermined diffraction gratings 431 to 438 can be located on an optical path of the laser beam L by rotating the diffractive optical element 43 around the center axis A. Although not shown in FIG. 8, the diffraction gratings 431 to 434 are formed in a stripe shape in which a phase shifts by $\pi/2$ at a time. The diffraction gratings 435 to 438 are formed in a stripe shape in which a phase of a projection pattern on a projection surface shifts by $\pi/2$ at a time. A pitch of the projection pattern on the projection surface is a double of a pitch of a projection pattern of the diffraction gratings 431 to 434.

In the laser emitter 41 having such a configuration, by locating the diffraction gratings 431 to 438 on the optical path of the laser beam L in order, it is possible to project eight projection patterns P on the object W in order.

In such a fourth embodiment, the laser emitter 41 includes the diffractive optical element 43 configured to diffuse the laser beam L1. By diffusing the laser beam L in this way, the intensity of the laser beam L decreases with distance from the laser emitter 41. Therefore, the three-dimensional measuring device 4 is safer.

The three-dimensional measuring device, the controller, and the robot system according to the present disclosure are explained above based on the illustrated embodiments. However, the present disclosure is not limited to this. The components of the sections can be replaced with any components having the same functions. Any other components may be added to the present disclosure.

What is claimed is:

1. A three-dimensional measuring system that performs three-dimensional measurement of an object using a laser beam, the three-dimensional measuring system comprising:
   a robot configured to grasp the object, the robot being movable about movement range;
   a human detection information receiver configured to receive information from a human detection sensor that detects a person present within a detection range that corresponds to the movement range of the robot;
   a laser emitter configured to irradiate a region including the object with the laser beam;
   a laser emission controller configured to control power of the laser beam irradiated from the laser emitter to first power and second power lower than the first power;
   an image capturing device configured to image the object, on which the laser beam is irradiated, and acquire image data; and a point-group-data generator configured to generate, based on the image data, three-dimensional point group data of a region including the object, wherein when the human detection information receiver receives, from the human detection sensor, first information indicating that the person is absent within the detection range, the laser emission controller controls the power of the laser beam to the first power.

2. The three-dimensional measuring device according to claim 1, wherein, when the human detection information receiver receives, from the human detection sensor, second information indicating that the person is present within the detection range, the laser emission controller controls the power of the laser beam to the second power.

3. The three-dimensional measuring device according to claim 1, wherein the laser emission controller starts the irradiation of the laser beam at the second power and, when the human detection information receiver receives the first information before the irradiation of the laser beam is completed, maintains the irradiation of the laser beam at the second power.

4. The three-dimensional measuring device according to claim 1, wherein the laser emission controller starts the irradiation of the laser beam at the first power and, when the human detection information receiver receives, before the irradiation of the laser beam is completed, from the human detection sensor, second information indicating that the person is present within the detection range, switches the power of the laser beam to the second power or stops the irradiation of the laser beam.

5. The three-dimensional measuring device according to claim 1, further comprising an image capturing controller configured to control an image capturing mode of the image capturing device, wherein the image capturing controller includes, as the image capturing mode, a first image capturing mode in which an exposure time of the image capturing device is a first exposure time and a second image capturing mode in which the exposure time of the image capturing device is longer than the first exposure time, and when the power mode is the first power mode, the image capturing controller controls the image capturing mode to the first image capturing mode.

6. The three-dimensional measuring device according to claim 5, wherein, when the power of the laser beam is the second power, the image capturing controller controls the image capturing mode to the second image capturing mode.

7. The three-dimensional measuring device according to claim 1, wherein the laser emitter includes a mirror configured to diffuse the laser beam.

8. The three-dimensional measuring device according to claim 1, wherein the laser emitter includes a lens configured to diffuse the laser beam.

9. The three-dimensional measuring device according to claim 1, wherein the laser emitter includes a diffractive optical element configured to diffuse the laser beam.

* * * * *